United States Patent Office 3,278,640
Patented Oct. 11, 1966

3,278,640
SEGMENTED COPOLYESTER COMPRISING AROMATIC AND ALIPHATIC POLYESTER SEGMENTS
Eugene P. Goldberg, Highland Park, Frank Scardiglia, Arlington Heights, and Bing-Jen Chen, Evanston, Ill., assignors to Borg-Warner Corporation, Chicago, Ill., a corporation of Illinois
No Drawing. Filed Mar. 11, 1963, Ser. No. 264,068
8 Claims. (Cl. 260—860)

This invention relates to linear block copolymers comprised of recurring, alternating block units of two different polyesters, i.e. (1) fully aromatic polyester units and (2) aliphatic polyester units. More particularly, this invention relates to high molecular weight polyester block copolymers that may be tailored to exhibit a combination of extremely desirable physical and chemical properties.

There is a growing need in the synthetic polymer industry for stronger, tougher and more economical polymers for use as films, fibers, molded parts, and the like. The new copolymer compositions of this invention may be economically prepared from readily available monomers and exhibit extremely high tensile strength, impact strength, high heat distortion, and can be selectively formulated to exhibit a wide range of softening temperatures and viscosities. The polymers also possess unique properties such as high melting points, and good stability.

Linear segmented copolyesters have been known heretofore. For example, Flory U.S. Patent No. 2,691,006 teaches the preparation of segmented copolyesters from two different preformed polyesters. Also, Frazer U.S. Patent No. 3,037,960 teaches the preparation of elastomeric compounds from the combining of polyesters.

Flory very generally states that polyester units may be interconnected in a polymer chain by ester linkages to provide fiber-forming copolyesters. Flory does not, however, recognize that it is necessary to make a critical selection of starting materials to provide rigid, semi-rigid, or flexible thermoplastics possessing a desired balance of chemical and physical properties.

Frazer, through careful selection of starting polyesters for copolymerization, produces highly elastomeric polymers. Frazer accomplishes this by utilizing from 60% to 90% by weight of flexible aliphatic units in the copolyester chain. These aliphatic units have a molecular weight below about 5,000. The preferred range of the aliphatic polyester copolymerized is between about 800 and 5,000.

Generally, the present invention is directed to tough, rigid, high temperature, segmented, substantially linear copolyesters consisting of alternating first and second polyester segments. The first polyester segments are comprised of recurring aliphatic polyester structural units derived from at least one aliphatic dicarboxylic acid, or derivative thereof. The aliphatic polyester segments utilized are generally provided from a preformed polyester having a molecular weight ranging from about 1,000 to about 20,000. The preferred molecular weight of the aliphatic polyester segments is about 5,000 to about 20,000. The aliphatic polyester segments of the copolyesters comprise about 5% to about 50% by weight of the total weight of the copolyester product.

The second segments of the copolyesters of this invention are comprised of recurring aromatic polyester structural units derived from at least one aromatic dicarboxylic acid, or a derivative thereof, reacted with at least one diphenol or derivative. The second aromatic polyester segments are fully aromatic structural units formed in situ. The aromatic portion may contain from about 95% to about 50% by weight of the total weight of the copolyester product.

More specifically, the linear copolymers of the present invention are comprised of recurring (B) aliphatic polyester structural units of the formula:

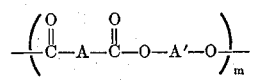

Formula I and (C) aromatic polyester structural units of the formula:

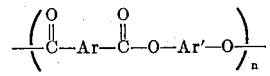

Formula II where A and A' are bivalent aliphatic radicals which may contain one or more double bonds and one or more bivalent radicals made up of atoms other than carbon, such as —O—, —S—, etc. Ar and Ar' are bivalent aromatic radicals, $m$ is a positive integer equal to or greater than five, and $n$ is a positive integer greater than unity. The units may be joined into long molecular chains in a wide variety of fashions. It will be noted that in each case of joining molecular chains sub $m$ of Formula I will generally have an average value at least equal to or greater than five, and sub $n$ of Formula II will be at least one.

Block copolymers having tailored structure are preferably provided in accordance with this invention in the following manner.

At least one aliphatic dicarboxylic acid chloride or derivative thereof is reacted with at least one glycol or derivative thereof to provide an acid chloride terminated aliphatic polyester. The polyester ingredients may be reacted by direct esterification. For purposes of this invention, the acid chloride terminated aliphatic polyester block may be prepared by any of the conventional methods well known in the art. These polyesters as mentioned will have a molecular weight of between about 1,000 and about 20,000. The acid chloride terminated polyester is mixed with at least one aromatic dicarboxylic acid chloride in an inert organic solvent, and this mixture is added to an aqueous solution of the alkali metal salt of at least one diphenol. A polycondensation reaction is then conducted interfacially. If desired, the order of addition of the reactants may be reversed, i.e. the aqueous solution of the alkali metal salt of at least one diphenol may be added to the mixture of acid chloride terminated polyester and aromatic dicarboxylic acid chloride.

As the molecular weight of the acid chloride terminated aliphatic polyester block is generally higher than the molecular weight of the aromatic dicarboxylic acid chloride, the aliphatic polyester will provide fewer reactive acid chloride end groups for further reaction with a diphenol than are provided by the aromatic dicarboxylic acid chloride or chlorides. Thus, when the diphenol reactant is combined with the mixture for polycondensation, the possibility of the diphenol reacting with the aromatic dicarboxylic acid chloride or chlorides is much greater than the possibility of the diphenol reacting with the acid chloride terminated polyester group. Adding a preformed acid chloride terminated aliphatic polyester and an aromatic dicarboxylic acid chloride to an aqueous solution of an alkali metal salt of a diphenol causes an aromatic polyester block to be formed in situ. The aliphatic block and aromatic block are ester linked by the diphenol.

The structure of the polymeric chain may be determined statistically in that there will be a given number of reactive chloride end groups on the aliphatic polyester units and also a given number of reactive chloride end groups on the aromatic dicarboxylic acid chloride units; and the structure of the polymer formed may be predetermined by varying the molecular weight of the aliphatic polyester and aromatic dicarboxylic acid chloride as well as varying the amount of ingredients reacted. It may be noted that in some cases, what might be expected on a statistical basis may be affected by reaction conditions such as temperature, relative reactivities of given acid chloride end groups, diffusion-controlled processes, mode or order of addition of reactants, etc.

To indicate what may happen in the statistical joining of the polymeric units of the copolyesters of this invention, the addition of given ingredients are illustrated herein below: For example, if 10 grams of aliphatic acid chloride terminated polyester, having a molecular weight of 8,000, were mixed with 10 grams of aromatic dicarboxylic acid chloride having a molecular weight of 200, and this mixture were in turn reacted with an aqueous solution of the alkali metal salt of a diphenol, the chances of the diphenol reacting with the aromatic dicarboxylic acid chloride would be in the order of 40 times greater than the chances of the diphenol reacting with the acid chloride terminated aliphatic polyester units. This is, of course, assuming that all of the acid chloride groups had the same reactivity.

The physical and chemical properties of a copolymer resulting from the combining of ester units, as described, depends on the average molecular weight and the mole percent of the aliphatic polyester block. It will be evident that the mole percent of the aliphatic polyester block (with an average molecular weight in the range of 1,000 to 20,000) will be lower than the mole percent of the monomeric co-reactants.

The acid chloride terminated aliphatic polyester that is mixed with at least one aromatic dicarboxylic acid chloride, as above mentioned, may be provided by reacting at least one aliphatic dicarboxylic acid chloride with at least one glycol. The aliphatic dicarboxylic acid chloride is generally represented by Formula III:

FORMULA III wherein A is a hydrocarbon radical. Examples of dicarboxylic acid chlorides that are useful in the practice of this invention include aliphatic and cycloaliphatic dicarboxylic acid chlorides of which the following are representative: malonyl chloride; oxalyl chloride; succinyl chloride; glutaryl chloride; adipyl chloride; pimelyl chloride; suberyl chloride; azelayl chloride; sebacyl chloride; cis- and trans-1,4-cyclohexanedicarboxylic acid chloride; cis- and trans-1,3-cyclohexanedicarboxylic acid chloride; cis- and trans-1,3-cyclobutanedicarboxylic acid chloride; etc.

The glycols that may be reacted with the aliphatic dicarboxylic acid chlorides are generally represented by Formula IV:

HO—R—OH

FORMULA IV wherein R is a bivalent aliphatic or alicyclic hydrocarbon radical. Included among the aliphatic glycols which may be reacted with aliphatic dicarboxylic acid chlorides to form the acid chloride terminated polyester are ethylene, propylene, isobutylene, tetramethylene, pentamethylene, 2,2-dimethyltrimethylene, hexamethylene, and decamethylene glycols, and 1,4-di-(hydroxymethyl)-cyclohexane.

Alternatively, the acid chloride terminated polyester blocks may be prepared by the following techniques: (1) treatment of a carboxyl terminated polyester (which can be prepared by reacting a glycol with a slight excess of a dicarboxylic acid in the presence of an esterification catalyst) with a chlorinating agent, such as thionyl chloride, $PCl_3$, $PCl_5$, etc.; and (2) treatment of a low molecular weight hydroxyl terminated polyester with a slight excess of a dicarboxylic acid chloride.

The aromatic dicarboxylic acid chloride that is mixed with the acid chloride terminated aliphatic polyester has the general formula:

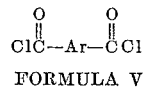

FORMULA V wherein Ar is a bivalent aromatic hydrocarbon radical.

Examples of the aromatic dicarboxylic acid chlorides are as follows: phthalyl chloride; isophthalyl chloride; terephthalyl chloride; 4,4'-biphenyldicarboxylic acid chloride; 4,4'-diphenylmethanedicarboxylic acid chloride; 2,2-bis(4-carboxychlorophenyl)-propane; etc.

Essentially any dihydric phenol or derivative thereof may be reacted with the mixture of at least one aromatic dicarboxylic acid chloride and acid chloride terminated aliphatic polyester. The diphenol is generally represented by Formula VI:

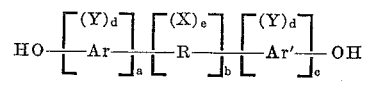

FORMULA VI wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, etc.; a linkage selected from the group consisting of ether; carbonyl; amino; a sulfur containing linkage, e.g., sulfide, sulfoxide, sulfone; a silicon containing linkage, e.g., silane or siloxy; a phosphorus containing linkage; etc. R can also consist of two or more alkylene or alkylidene linkages connected by such groups as aromatic, amino, ether, carbonyl, silane, siloxy, sulfide, sulfoxide, sulfone, a phosporus containing linkage, etc. Other groups which are represented by R will occur to those skilled in the art.

Ar and Ar' are mono- or polycarbocyclic aromatic groups such as phenylene, biphenylene, terphenylene, naphthylene, etc. Ar and Ar' may be the same or different.

Y is a substituent selected from the group consisting of organic, inorganic, or organometallic radicals. The substituents represented by Y include (1) halogen, e.g., chlorine, bromine, fluorine or (2) ether groups of the general formula OE, where E is a monovalent hydrocarbon radical similar to X or (3) monovalent hydrocarbon groups of the type represented by R or (4) other substituents, e.g., nitro, cyano, etc., said substituents being essentially inert to the polymerization reaction environment.

X is a monovalent hydrocarbon group exemplified by the following: alkyl, such as methyl, ethyl, propyl, isopropyl, butyl, decyl, etc.; aryl groups, such as phenyl, naphthyl, biphenyl, xylyl, tolyl, etc.; aralkyl groups, such as benzyl, ethylphenyl, etc.; cycloaliphatic groups, such as cyclopentyl, cyclohexyl, etc.; as well as monovalent hydrocarbon groups containing inert subsbtituents therein. It will be understood that where more than one X is used they may be alike or different.

$d$ is a whole number ranging from 0 to a maximum equivalent to the number of replaceable hydrogens substituted on the aromatic rings comprising Ar or Ar'. $e$ is a whole number ranging from 0 to a maximum controlled by the number of replaceable hydrogens on R. $a$, $b$, and $c$ are whole numbers including 0. When $b$ is not 0, neither $a$ nor $c$ may be 0. Otherwise either $a$ or $c$, but not both may be 0. Where $b$ is 0 in Formula VI, the aromatic groups are joined by a direct bond between the carbocyclic ring carbon atoms with no connecting alkyl or other linkage.

The hydroxyl and Y substituents on the aromatic groups, Ar and Ar', can be varied in the ortho, meta or para positions on the aromatic rings; and the groups can be in any possible geometric relationship with respect to one another.

Formula VI for the diphenols may also be more generally and conveniently depicted by Formula VII, wherein the aromatic carbocyclic group D represents all of the Formula VI molecule except the hydroxyl functions:

FORMULA VII

Examples of difunctional phenols that are useful in the practice of this invention include bisphenols of which the following are representative:

2,2-bis-(4-hydroxyphenyl)-propane (Bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane;
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydroxyphenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxphenyl)-propane.

The preparation of these and other applicable bisphenols is known in the art. They are most commonly prepared by condensation of two moles of a phenol with a single mole of a ketone or aldehyde.

Also useful are dihydroxybenzenes typified by hydroquinone and resorcinol; dihydroxybiphenyls, such as 4,4'-dihydroxybiphenyl, 2,2'-dihydroxybiphenyl, 2,4'-dihydroxybiphenyl; and dihydroxynaphthalenes, such as 2,6-dihydroxynaphthalene, etc.

Dihydroxyaryl sulfones are also useful, such as bis-(4-hydroxyphenyl)-sulfone; 2,4'-dihydroxyphenyl sulfone; 2,4'-dihydroxy-5'-chlorophenyl sulfone; 3'-chloro-4,4'-dihydroxyphenyl sulfone; bis-(4-hydroxyphenyl)-biphenyl disulfone; etc. The preparation of these and other useful dihydroxyarylsulfones is described in United States Patent No. 2,288,282, issued to Huissmann. Polysulfones as well as sulfones substituted with halogen, nitro, alkyl, and other substituents are also useful. In addition, related sulfides and sulfoxides are applicable.

Dihydroxyaromatic ethers are useful and may be prepared by methods found in United States Patent No. 2,739,171, issued to Linn and in "Chemical Reviews," 38, 414–417 (1946). Typical of such dihydroxyaryl ethers are the following:

4,4'-dihydroxyphenyl ether;
4,4'-dihydroxy-2,6-dimethylphenyl ether;
4,4'-dihydroxy-3,3'-diisobutylphenyl ether;
4,4'-dihydroxy-3,3'-diisopropylphenyl ether;
4,4'-dihydroxy-3,2'-dinitrophenyl ether;
4,4'-dihydroxy-3,3'-dichlorophenyl ether;
4,4'-dihydroxynaphthyl ether;

etc. The many other types of suitable dihydroxyaryl compounds will be apparent to those skilled in the art.

As mentioned, the aliphatic polyester units of the block copolymers can be readily prepared by conventional techniques, such as for example, reaction of a polymeric glycol with a slight excess of an aliphatic dicarboxylic acid chloride. The polycondensation of the diphenols with the acid chloride terminated aliphatic polyesters that have been previously mixed with at least one aromatic dicarboxylic acid chloride is preferably conducted via an interfacial polycondensation technique. The interfacial polymerization may be carried out at or near room temperature by mixing a basic aqueous solution of alkali metal salt of at least one diphenol with the mixture of acid chloride terminated aliphatic polyester and aromatic dicarboxylic acid chloride contained in an inert organic solvent. The addition of a basic organic catalyst, such as a quaternary ammonium salt or a suitable amine, is useful in promoting higher molecular weights. The reaction mixtures are preferably stirred vigorously for varying periods of time; and the copolymers precipitated or coagulated by any suitable means, as for example, by addition to a non-solvent, such as isopropylalcohol. The precipitated copolymers are generally washed to remove any residual impurities and dried.

The organic solvent utilized for the mixture of the acid chloride terminated aliphatic polyester and aromatic dicarboxylic acid chloride may be any inert organic solvent which preferably also has some solvent power with respect to the polymer formed. Typical of such solvents are methylene chloride, tetrachloroethylene, tetrachloroethane, chloroform, carbontetrachloride, o-dichlorobenzene, etc. The concentration of reactants in the aqueous and organic phases may vary over a relatively wide range, from less than one weight percent to more than 20 weight percent, being limited at the high concentration only by the increasing difficulties encountered in handling the extremely viscous media formed. Polymerization time may be varied from less than five minutes to more than three hours, depending upon the reactivity of the copolymer reactants and the molecular weight desired. Extremely short polymerization periods will generally result in lower molecular weight copolymers, as compared with longer polymerization periods which provide higher molecular weights. Although it may be preferred in certain cases to use approximately equimolar quantities of diphenols with the acid chloride terminated aliphatic polyesters and aromatic dicarboxylic acid chloride mixtures, the reactivity of the acid chloride terminated mixture and the reaction conditions are such that the use of exact stoichiometry is not critical to the attainment of relatively high molecular weight block copolymers. The mode of addition of the acid chloride mixture, i.e. the acid chloride terminated aliphatic polyester and aromatic dicarboxylic acid chloride, to the diphenols is therefore governed by the nature of the copolymer desired; and it is possible to add incrementally or to batch mix the reactants if desired. In addition, it is also possible to invert the order of addition of reactants and add the diphenols to the acid chloride terminated mixture.

The basic organic catalyst also may be added initially or during the course of the polycondensation, or alternatively it may be added incrementally during the reaction. Although benzyltrimethylammonium chloride is a particularly effective catalyst, other quaternary salts and suitable amines are effective. The amount of catalyst added may vary from less than one hundredth weight percent to more than one weight percent. Though the polymerization temperature may be varied over a wide range, as for example, from less than 0° C. to more than 100° C., it is most convenient to conduct the reaction at or about room temperature, i.e. 25° C.

The following examples are illustrative of the preparation of aliphatic polyester-aromatic polyester copolymers from aliphatic polyester acid chlorides mixed with aromatic dicarboxylic acid chlorides and reacted with diphenols.

EXAMPLE I

*Preparation of acid chloride terminated aliphatic polyester*

A solution of 54.4 g. (0.522 mole) of neopentyl glycol in 200 ml. of o-dichlorobenzene was introduced into a 500 ml. resin kettle furnished with stirrer, thermometer, condenser, and gas inlet tube. The solution was heated to 80° C. and adipyl chloride (98.5 g., 0.538 mole) was added dropwise over a four hour period at 80–90° C. An inert atmosphere was maintained in the reaction vessel by bubbling through the solution a slow stream of argon. The reaction mixture was kept at 80–90° C. for three additional hours and at 60–65° C. overnight. The o-dichlorobenzene and the excess adipyl chloride were then removed by vacuum distillation. The reaction mixture was then heated in vacuo at 100–110° C. for 2.5 hours.

The product was a very viscous yellow liquid which had an intrinsic viscosity of 0.28 dl./g. measured in o-dichlorobenzene and a molecular weight, measured by means of infrared spectroscopy, of 7700. The concentration of hydroxyl and carboxyl end groups was below the limit of detection using an infrared spectrophotometer.

By varying the dicarboxylic acid chloride to glycol ratio and the reaction conditions, acid chloride-terminated polyester blocks in the molecular weight range of 1,000 to 20,000 can be readily obtained.

The following example illustrates the method of preparation of block copolymers derived from acid chloride-terminated aliphatic polyester blocks, aromatic dicarboxylic acid chlorides and diphenols.

EXAMPLE II

*Preparation of block copolymer derived from isophthalyl chloride, terephthalyl chloride, poly(neopentyl adipate) and Bisphenol–A*

A solution of 2.436 g. (12.0 mmoles) of isophthalyl chloride, 2.436 g. (12.0 mmoles) of terephthalyl chloride and 1.22 g. of acid chloride-terminated poly(neopentyl adipate) having an intrinsic viscosity of 0.28 dl./g. in 150 ml. of methylene chloride was added at 0.5° C. over a five minute period to a solution of 5.50 g. (24.15 mmoles) of Bisphenol–A, 53 mmoles of NaOH and 8 drops of a 60% aqueous solution of benzyltrimethylammonium chloride in 150 ml. of water. The reaction mixture was agitated vigorously for two hours at 0–10° C. The aqueous phase was discarded and the block copolymer was coagulated by addition of the methylene chloride layer to isopropanol. The block copolymer was washed several additional times with distilled water and isopropanol and dried overnight in a vacuum oven at 75–80° C. The intrinsic viscosity of the block copolymer, measured in 1,1,2,2-tetrachloroethane, was 1.46 dl./g.

The examples shown in the following four tables were prepared by the same method as described in Example II. As indicated in the examples, the reactants and their ratios are varied.

EXAMPLES II THROUGH VII

| Example | II | III | IV | V | VI | VII |
|---|---|---|---|---|---|---|
| Isophthalyl chloride, g | 2.44 | 4.06 | 4.06 | | | 2.03 |
| Terephthalyl chloride, g | 2.44 | | | 4.06 | 4.06 | 2.03 |
| Poly(neopentyl adipate), g | 1.22 | 1.02 | 2.71 | 1.05 | 2.71 | 1.05 |
| Mole percent of poly(neopentyl adipate) | 0.63 | 1.90 | 4.90 | 1.90 | 4.90 | 1.90 |
| Average molecular weight of poly(neopentyl adipate) | 7,700 | 2,400 | 2,400 | 2,400 | 2,400 | 2,400 |
| Bisphenol-A, g | 5.50 | 4.65 | 4.80 | 4.65 | 4.80 | 4.65 |
| Intrinsic Viscosity | 1.46 | 0.89 | 0.94 | 1.23 | 1.41 | 1.58 |
| Ultimate tensile strength, p.s.i.: | | | | | | |
| 25° C | 7,000 | 9,300 | 3,900 | 7,600 | 5,000 | 9,500 |
| 90° C | 7,900 | 2,500 | 2,300 | 4,900 | 3,500 | 5,600 |
| 160° C | 3,300 | | | | | |
| Yield strength, p.s.i.: | | | | | | |
| 25° C | 7,000 | | | 8,300 | 5,200 | 8,300 |
| 80° C | 4,200 | 3,200 | | | 3,100 | 4,900 |
| 160° C | 2,000 | | | | | |
| Percent Elongation at break: | | | | | | |
| 25° C | 19 | 12 | 12 | 62 | 38 | 88 |
| 80° C | 125 | 48 | 18 | 89 | 250 | 175 |
| 160° C | 120 | | | | | |
| Ultimate tensile strength of oriented film, p.s.i., 25° C | 14,900 | | | | 14,900 | 18,600 |
| Heat distortion temp., ° C., 264 p.s.i. load (micro test) | 202 | | | | | 164 |
| Impact strength, kg. cm./cm.² | 15.5 | | | | | 9.8 |

EXAMPLES VIII THROUGH XIII

| Examples | VIII | IX | X | XI | XII | XIII |
|---|---|---|---|---|---|---|
| Isophthalyl chloride, g | 2.03 | 2.44 | 1.22 | 1.83 | 3.65 | 3.04 |
| Terephthalyl chloride, g | 2.03 | 2.44 | 3.65 | 3.04 | 1.22 | 1.83 |
| Poly(neopentyl adipate), g | 2.71 | 3.47 | 3.47 | 3.47 | 3.47 | 3.47 |
| Mole percent of poly(neopentyl adipate) | 4.90 | 1.66 | 1.66 | 1.66 | 1.66 | 1.66 |
| Average molecular weight of poly(neopentyl adipate) | 2,400 | 7,700 | 7,700 | 7,700 | 7,700 | 7,700 |
| Bisphenol-A, g | 4.80 | 5.58 | 5.58 | 5.58 | 5.58 | 5.58 |
| Intrinsic Viscosity | 1.01 | 1.15 | 1.55 | 1.38 | 0.98 | 0.98 |
| Ultimate tensile strength, p.s.i.: | | | | | | |
| 25° C | 7,900 | 7,000 | 9,200 | 8,600 | 7,900 | 8,000 |
| 80° C | 5,700 | 6,700 | 6,400 | 4,200 | 7,100 | 9,000 |
| 160° C | | 3,900 | 5,000 | 4,400 | 5,000 | 4,000 |
| Yield strength, p.s.i.: | | | | | | |
| 25° C | 7,300 | 5,500 | 7,300 | 7,000 | 7,900 | 7,500 |
| 80° C | 4,100 | 3,200 | 4,200 | 4,200 | 5,500 | 5,400 |
| 160° C | | 1,800 | 1,700 | 1,700 | 2,000 | 1,800 |
| Percent Elongation at break: | | | | | | |
| 25° C | 112 | 88 | 68 | 72 | 12 | 84 |
| 80° C | 310 | 115 | 94 | 31 | 124 | 150 |
| 160° C | | 130 | 127 | 142 | 198 | 136 |
| Ultimate tensile strength of oriented film, p.s.i., 25° C | 14,400 | 11,800 | 11,000 | 11,000 | 18,000 | 17,600 |
| Heat distortion temp., ° C., 264 p.s.i. load (micro test) | 137 | 200 | 161 | 193 | 192 | 196 |
| Impact strength, km. cm./cm.² | 12.0 | 23.1 | 3.4 | 2.1 | 2.0 | 2.0 |

EXAMPLES XIV THROUGH XVIII

| Examples | XIV | XV | XVI | XVII | XVIII |
|---|---|---|---|---|---|
| Isophthalyl chloride, g | 10.88 | 8.7 | 2.99 | 8.87 | 4.3 |
| Terephthalyl chloride, g | 10.88 | 8.7 | 2.99 | 8.77 | 4.3 |
| Poly(neopentyl adipate), g | | | 7.37 | 2.22 | 10.0 |
| Poly(neopentyl azelate), g | 25.0 | | | | |
| Poly(1,6-hexanediol succinate), g | | 20.0 | | | |
| Mole percent of aliphatic block | 3.2 | 3.2 | 5.6 | 3.2 | 2.9 |
| Average molecular weight of aliphatic block | 7,000 | 7,000 | 4,200 | 8,000 | 8,000 |
| Bisphenol-A, g | 25.0 | 20.0 | 7.37 | 20.0 | 10.0 |
| Intrinsic Viscosity | 0.95 | 1.25 | 1.32 | 1.20 | 1.35 |
| Heat distortion temp., °C., 264 p.s.i. load (micro test) | 175 | 151 | 152 | 198 | 180 |
| Impact strength, kg. cm./cm.² | 30.7 | 28.0 | 55.9 | 55.9 | 28.1 |

EXAMPLES XIX THROUGH XXII

| Examples | XIX | XX | XXI | XXII |
|---|---|---|---|---|
| Isophthalyl chloride, g | 2.462 | 2.442 | 4.924 | 2.442 |
| Terephthalyl chloride, g | 2.462 | 2.442 | 4.924 | 2.442 |
| Poly(neopentyl azelate), g | 1.395 | 3.49 | | |
| Poly(1,6-hexanediol succinate), g | | | 2.79 | 3.49 |
| Mole percent of aliphatic block | 0.8 | 2.0 | 0.8 | 2.0 |
| Average molecular weight of aliphatic block | 7,000 | 7,000 | 7,000 | 7,000 |
| Bisphenol-A, g | 5.58 | 5.58 | 11.16 | 5.58 |
| Intrinsic Viscosity | 1.55 | 1.21 | 1.88 | 0.85 |
| Ultimate tensile strength, p.s.i.: | | | | |
| 25° C | 10,800 | 7,200 | 10,300 | 9,400 |
| 160° C | 3,400 | 2,200 | 3,900 | 1,800 |
| 25° C, oriented | 17,800 | 11,200 | 17,200 | 11,400 |
| Yield strength, p.s.i.: | | | | |
| 25° C | 7,800 | 5,500 | | 8,500 |
| 160° C | 2,400 | 1,200 | 2,000 | 1,100 |
| 25° C, oriented | 11,600 | 5,400 | 14,300 | 9,500 |
| Percent Elongation: | | | | |
| 25° C | 84 | 76 | | 98 |
| 160° C | 134 | 269 | 129 | 136 |
| Heat Distortion, °C., 264 p.s.i. (micro test) | 193 | 185 | 174 | 161 |
| Impact strength, kg.cm./cm.² | 29.4 | 13.2 | 12.7 | 21.1 |

From the foregoing descriptions and examples, it will be apparent that the polyester copolymer compositions of this invention are inherently versatile and useful thermoplastic polyesters. The examples further indicate that the polymers have extraordinary tensile and high temperature properties which make them especially adaptable compositions for films, fibers, molded parts, etc.

Obviously, many modifications and variations of the invention as hereinbefore set forth may be made without departing from the spirit and scope thereof; and therefore, only such limitations should be imposed as are indicated in the appended claims. For example, it will be appreciated by those skilled in the art that varying the nature and the ratio of the reactants will vary the physical and chemical properties of the resulting products.

We claim:

1. A linear segmented block copolymer having an intrinsic viscosity of at least 0.3 dl./g. measured in 1,1,2,2-tetrachloroethane at room temperature, consisting essentially of polyester structural units prepared from dicarboxylic acid chlorides reacted with at least one compound selected from the group consisting of glycols and alkali metal salts of phenols, said copolymer containing from about 5 percent to about 50 percent recurring aliphatic polyester structural units of the formula

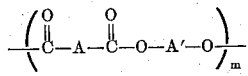

and correspondingly from about 95 percent to about 50 percent recurring aromatic polyester structural units of the formula

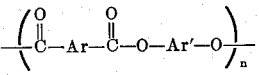

wherein A and A' are bivalent aliphatic radicals, Ar and Ar' are bivalent aromatic radicals, m is a positive integer equal to at least 5 and n is a positive integer equal to at least 1, said aliphatic polyester units of said copolymer having a molecular weight of between about 1,000 and about 20,000.

2. A linear segmented block copolymer having an intrinsic viscosity of at least 0.3 dl./g. measured in 1,1,2,2-tetrachloroethane at room temperature consisting essentially of from about 5 percent to about 50 percent by weight of recurring aliphatic polyester structural units selected from condensation reaction products of at least one aliphatic dicarboxylic acid chloride reacted with at least one glycol, said polyester structural units represented by the formula:

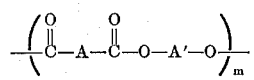

and correspondingly from about 95 percent to about 50 percent by weight recurring aromatic polyester structural units selected from condensation reaction products of at least one aromatic dicarboxylic acid chloride reacted with at least one alkali metal salt of a phenol, said polyester structural units represented by the formula:

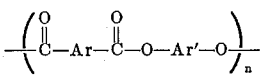

wherein A and A' are bivalent aliphatic radicals, Ar and Ar' are bivalent aromatic radicals, m is a positive integer equal to at least 5 and n is a positive integer equal to at least one, said aliphatic polyester units of said copolymer having a molecular weight of between about 1,000 and about 20,000.

3. The linear segmented block copolymer of claim 2 wherein the aliphatic polyester units are prepared by reacting adipyl chloride with neopentyl glycol.

4. The linear segmented block copolymer of claim 2 wherein the aliphatic polyester units are prepared by reacting succinyl chloride with hexanediol.

5. The linear segmented block copolymer of claim 2 wherein the aliphatic polyester units are prepared by reacting azelayl chloride with neopentyl glycol.

6. The linear segmented block copolymer of claim 2 wherein the aromatic polyester units are prepared by reacting isophthalyl chloride with 2,2-bis-(4-hydroxyphenyl-)propane.

7. The linear segmented block copolymer of claim 2 wherein the aromatic polyester units are prepared by reacting terephthalyl chloride with 2,2,-bis-(4-hydroxyphenyl)-propane.

8. The process of preparing a segmented block copolymer consisting essentially of recurring aliphatic polyester segments and recurring aromatic polyester segments which comprises the steps of:

reacting at least one aliphatic dicarboxylic acid chloride with at least one glycol to provide an acid chloride terminated polyester having a molecular weight between about 1,000 and 20,000;

adding said aliphatic polyester to at least one aromatic dicarboxylic acid chloride;

reacting said mixture with an aqueous solution of at least one alkali metal salt and at least one diphenol, to thereby provide a segmented block copolymer having an intrinsic viscosity in excess of 0.3 dl./g. when measured in 1,1,2,2-tetrachloroethane at room temperature, which polyester contains from about 5 percent to about 50 percent by weight aliphatic polyester segments and correspondingly about 95 percent to about 50 percent by weight aromatic polyester segments.

References Cited by the Examiner

UNITED STATES PATENTS

| 2,691,006 | 10/1954 | Flory | 260—860 |
| 3,037,960 | 6/1962 | Frazer | 260—860 |
| 3,160,602 | 12/1964 | Kantor et al. | 260—47 |

FOREIGN PATENTS

| 901,605 | 7/1962 | Britain. |
| 1,303,888 | 8/1962 | France. |

MURRAY TILLMAN, *Primary Examiner.*

J. T. GOOLKASIAN, *Assistant Examiner.*